(12) United States Patent
De Boursetty et al.

(10) Patent No.: US 7,660,863 B2
(45) Date of Patent: Feb. 9, 2010

(54) CONFIDENCE COMMUNICATION METHOD BETWEEN TWO UNITS

(75) Inventors: Benoît De Boursetty, Paris (FR); Manuel Gruson, Paris (FR); Dimitri Mouton, Paris (FR)

(73) Assignee: France Telecom, Paris (FR)

( * ) Notice: Subject to any disclaimer, the term of this patent is extended or adjusted under 35 U.S.C. 154(b) by 136 days.

(21) Appl. No.: 10/539,456

(22) PCT Filed: Oct. 29, 2003

(86) PCT No.: PCT/FR03/03225

§ 371 (c)(1),
(2), (4) Date: Feb. 6, 2006

(87) PCT Pub. No.: WO2004/066581

PCT Pub. Date: Aug. 5, 2004

(65) Prior Publication Data

US 2006/0168237 A1 Jul. 27, 2006

(30) Foreign Application Priority Data

Dec. 18, 2002 (FR) .................................. 02 16091

(51) Int. Cl.
*G06F 15/16* (2006.01)
(52) U.S. Cl. ..................... 709/207; 709/205; 709/206; 455/466; 455/412
(58) Field of Classification Search .................. 709/207, 709/206, 205
See application file for complete search history.

(56) References Cited

U.S. PATENT DOCUMENTS

| 6,138,148 A * | 10/2000 | Lipkin ........................ 709/206 |
| 6,275,938 B1 | 8/2001 | Bond et al. ................. 713/200 |
| 7,185,202 B2 * | 2/2007 | Philips ....................... 713/176 |
| 2001/0027474 A1 * | 10/2001 | Nachman et al. ........... 709/204 |
| 2004/0205119 A1 * | 10/2004 | Streble et al. ............... 709/203 |

OTHER PUBLICATIONS

PCT International Search Report (3 pgs).

(Continued)

*Primary Examiner*—Matthew D Anderson
*Assistant Examiner*—Adel Youssef
(74) *Attorney, Agent, or Firm*—Drinker Biddle & Reath LLP

(57) ABSTRACT

A method for communication between a first unit and a second unit via a telecommunications network, wherein the first unit comprises a first family of applications and a second family of applications having communication capacities on the network extending beyond communication capacities of the applications of the first family, the method including: obtaining, by a confidence component belonging to the second family of applications a statement of a question to be posed to a user of the first unit in the context of an execution of an application of the first family; presenting the question by the confidence component via a user interface and capturing a response from the user by the confidence component; and for at least one type of response from the user, transmitting from the confidence component to the second unit, via the network, at least one message identifying the question presented and indicating the response captured, said message being transmitted under conditions inaccessible to the applications of the first family.

18 Claims, 1 Drawing Sheet

OTHER PUBLICATIONS

Qusay Mahmoud: "Wireless Java Security", Java Sun, Jan. 2002, XP002249490 (3 pgs).
Dominic Lobo: "A Nokia View of Java Technology" Nokia Mobile Phones, Jun. 6, 2002, XP002249491 (8 pgs).
Nam-Je Park et al.: "M-commerce security platform based on WTLS and J2ME" Industrial Electronics, 2001. Proceedings. ISIE 2001, vol. 3, Jun. 12, 2001, pp. 1775-1780, XP101548897 (6 pgs).

* cited by examiner

CONFIDENCE COMMUNICATION METHOD BETWEEN TWO UNITS

RELATED APPLICATIONS

The subject application is a U.S. National Stage application that claims the priority of International Application No. PCT/FR2003/003225, filed on 29 Oct. 2003, which claims the priority of French National Application No.: 02/16091, filed on 18 Dec. 2002.

FIELD OF THE INVENTION

The present invention relates to personal computer terminals which enable users to access online services.

BACKGROUND

Terminals of this type may, in particular, be telephones using the wireless application protocol (WAP), office computers, portable computers or personal digital assistants (PDA), sharing the common characteristic of being connected to a digital data network which, in many practical cases, is a network operating according to the IP protocol ("Internet protocol"), in particular the Internet.

Various applications can be installed in these terminals. Among these applications, a distinction is frequently made according to various criteria such as their origin, the degree of confidence assigned to them by an administrator, etc., resulting in different capacities for certain applications in relation to others.

For example, in systems operating under the "Unix" operating system, the execution rights of applications in the "setuid root" class are the maximum rights, at administrator level, whereas the execution rights of other applications are simply the rights of the user launching the application. In another example involving Web browsers which comprise a virtual Java machine, the applications, referred to as "applets", downloaded from a given website, are limited in terms of their capacities to access the network, i.e. they can only transmit HTTP ("Hypertext transfer protocol") requests to this website.

Some of these execution rights of the applications are purely local. This is the case, for example, with the right to take control of the screen of a terminal, and the right to know all the keys pressed on the terminal keyboard, even for other applications.

However, other execution rights can be observed remotely. This is the case, for example, with the right to transmit any IP packets, including IP packets which do not comply with the most common transport protocol formats, i.e. TCP ("transmission control protocol") or UDP ("user datagram protocol"). In Unix systems, this right is not granted to applications which are not in the "setuid root" class. By using this difference in the capacity to transmit requests, a remote observer such as a server can determine that a given packet has been transmitted by an application in the "setuid root" class: if it observes that this packet does not comply with the TCP or UDP format, it must necessarily be an application in the "setuid root" class; if not, it may involve an application without special rights.

In the case of applets in browsers on personal computers, the capacities to send HTTP requests are limited to the single site from which the applet was downloaded. For each received HTTP request, a Web server may therefore infer that it originates either from an applet present on the site or from a different application (for example the browser). However, in any case, the requests received by a Web server do not originate from "foreign" applets present on other sites.

Interest is focused here on the problem of knowing how a server may, in a secure manner, capture the consent of the user with regard to a given question. The question to be posed to the user must be presented to the user via an application on the user's terminal. The application captures the consent (or refusal) of the user, then transmits a corresponding indication to the server.

The server therefore receives messages on the network and interprets them as the consent (or refusal) of the user. To do this, it must assume that the application has in fact presented the question to the user and has captured the user's consent in all honesty. The server therefore assumes that the application is not a "Trojan horse" which has, for example, presented a different question to the user, or has simply not presented the question to the user, but simulates the user's consent. To protect the user against any programs of the "Trojan horse" type, this assumption of confidence must be assured.

Several means exist for reasonably satisfying this assumption of confidence in the application.

Some applications are recognized as "confidence" applications. An application of this type is, for example, the WAP browser. A server may have confidence in a WAP browser for it to display a page posing a question to the user and wait for the user to enter his response.

In the case of a "closed" terminal (e.g. a. Minitel), the applications presented on the terminal are known and cannot be changed during the lifetime of the terminal. All these applications are recognized as "confidence" applications.

The openness of a terminal refers to the facility offered to the user to install, and often download, new applications which are intended to be run by the terminal itself. Examples of "open" terminals which integrate this facility are:

application-downloading telephones, for example of the Java MIDP type ("Mobile Information Device Profile", Sun Microsystems, Inc.);

browsers with scripting functionalities, for example of the WMLScript type (see "WAP WMLScript Language Specification", version 1.1, WAP Forum, November 2001) or ECMAScript (also referred to as JavaScript, see "ECMAScript Language Specification", Standard ECMA-262, third edition, December 1999), or browsers which accept applets;

most of the PDAs operating under operating systems such as PalmOS, WindowsCE, Symbian, etc.;

office or portable computers.

"Semi-open" terminals are open terminals in which certain functionalities are not directly accessible to the applications installed by the user or downloaded. For example, in a terminal whose only "openness" is ECMAScript, downloaded applications cannot access all the functionalities of the network (for example, transmission of any given IP packets). These functionalities may be accessible in an indirect and controlled manner. For example, an ECMAScript function may order the loading of a page via HTTP, which entails using the network, but in a controlled manner.

In "semi-open" terminals, there is coexistence:

of applications regarded as "confidence" applications, for example because they have been factory-installed by the terminal manufacturer, or because of the guarantee obtained by means such as the electronic signature of the application, etc.

and of other applications which may be installed on the terminal by the user himself, at his own discretion, but which do not access the same rights as the confidence applications.

On the other hand, "fully open" terminals are open terminals in which all functionalities are accessible to the downloaded applications. The notion of openness of a terminal depends largely on the context in which it occurs. For example, different layers of the OSI model (link/network/session/transport/etc.) may have different degrees of openness.

Interest is focused here on the functionalities which can be observed remotely from a server, i.e. network functionalities. In this context, the "semi-open" character of a terminal generally implies that execution rights which can be observed remotely and which are accessible to confidence applications are not accessible to non-confidence applications (for example the right to transmit requests other than HTTP on an IP network). This enables a server to distinguish, from among the requests received by it, those which originate from confidence applications and those which originate from other applications.

"Applets" which the user installs at his own discretion do not necessarily afford the confidence to access any given server. However, the restriction of the requests of each applet to the site from which it was downloaded enables a website to maintain control over the applets which can transmit requests to it. It is therefore reasonable for the server to assume that the applications presenting questions to the user are not Trojan horses. These applications are therefore "confidence" applications, but for one website only.

In open terminals, the possibility that a program may behave in a deceptive manner vis-à-vis the user (Trojan horse) must be taken into account. Thus, nothing can guarantee to a server that a request actually originates from the user and not from a program which has simulated the user's consent in the network. This risk undermines the confidence which the server may have in the data which it receives from a client. The assumption that the requests addressed to the server reflect the actions of the user is not reasonable if a Trojan horse has the facility to send them instead of the user.

The conventional response to the Trojan horse risk is to limit the capacities of the non-confidence applications.

The limitation of the transmission of frames from semi-open terminals is normally imposed in an extremely strict manner. Only confidence applications are authorized to transmit certain frames. This distinction is used so that the server does not accept, as representative of the user's consent, frames transmitted by non-confidence applications which may betray the user.

It therefore becomes impossible for an non-confidence application to transmit frames to a server. It is, in particular, impossible for this application to prove the user's consent to this server. For example, it is impossible for a non-confidence application to propose to the user to make a payment using an electronic commerce server.

For an "applet", which is restricted to being able to transmit requests only to the website from which it was downloaded, confidence is conferred upon this server only. It is therefore possible for this applet to capture the user's consent and to transmit the result to the website from which it was downloaded. It is therefore—reasonably—assumed that the server has never proposed to download "Trojan horse" type applications.

Cryptography-based systems exist to generate electronic signatures. An example is described in the specification "WAP WMLScript Crypto Library", WAP Forum, June 2001. These systems can be used to capture the user's consent, wherein they assume that the system is semi-open, i.e. in this case that the functions for accessing cryptographic keys are not directly available to non-confidence applications. Access to cryptographic keys is managed by a specific software component, which will be referred to as the "electronic signature component", and which is responsible for capturing the user's consent on behalf of the application. This component itself performs the following concatenation of operations on behalf of the non-confidence applications:

display the text to be signed on-screen;
wait for confirmation from the user
if confirmation is received, use the cryptographic keys of the user to sign the displayed text;
if not, do not sign the displayed text.

This therefore allows non-confidence applications to obtain an electronic signature of the user's consent via the electronic signature component. This method allows the server to obtain the user's consent concerning any given text.

It must also be assumed that the terminal is not fully open. If it were possible for a non-confidence application to gain direct access to cryptographic functions, it would not be possible to know whether the call for cryptographic functions was actually preceded by a display of the entire text to be signed or whether the terminal actually waited for the user's consent before proceeding with the signature.

Furthermore, this method implements cryptographic techniques which may prove costly in terms of execution time, the size of messages exchanged on the network and power consumption (an important consideration in the case of portable terminals). Moreover, legislation governing cryptographic techniques may possibly restrict the facility to make use of this method.

It is therefore desirable to provide a behavior which is more or less equivalent in terms of openness to non-confidence applications, but without using cryptography.

SUMMARY OF INVENTION

An object of the present invention is to enable a "non-confidence" application in a semi-open environment to capture the user's consent to a given question, and to report this to a remote server, proving to it that this has been done in an honest manner.

The invention therefore proposes a method for communication between a first unit and a second unit via a telecommunications network, wherein the first unit comprises a first family of applications and a second family of applications which has capacities to communicate on the network extending beyond the communication capacities of the applications of the first family. According to the invention, the method comprises the following steps:

/a/ a confidence component belonging to the second family of applications obtains the statement of a question to be posed to a user of the first unit in the context of the execution of an application of the first family;

/b/ the confidence component presents the question via a user interface and captures a response from the user; and /c/ for at least one type of response from the user, the confidence component transmits to the second unit, via the network, at least one message identifying the question presented and indicating the response captured, said message being transmitted under conditions which are inaccessible to the applications of the first family.

Another aspect of the present invention relates to a confidence software component for implementing the above method in said first unit, and also a communications terminal incorporating such a confidence software component. This confidence component belongs to the aforementioned second family of applications and includes instructions to control the following steps during its execution in the first unit:

/a/ obtain the statement of a question to be posed to a user of the first unit in the context of the execution of an application of the first family;

/b/ present the question via a user interface and capture a response from the user; and /c/ for at least one type of response from the user, transmit to the second unit, via the network, at least one message identifying the question presented and indicating the response captured, said message being transmitted under conditions which are inaccessible to the applications of the first family.

BRIEF DESCRIPTION OF THE DRAWINGS

Other features and advantages of the present invention will be shown in the description below of non-limiting embodiments, with reference to the attached drawings, in which.

DETAILED DESCRIPTION OF THE PREFERRED EMBODIMENTS

It is desired to enable a remote unit such as a server 1 to obtain, in a secure and flexible manner, the consent of the user of a semi-open terminal 2 relating to a given question. The consent may be obtained by confidence applications 3, as in the case of browsing, but also from non-confidence applications 4, which have more restricted (or non-existent) capacities to communicate on the telecommunications network R used to dialogue with the server 1.

Figure 1:
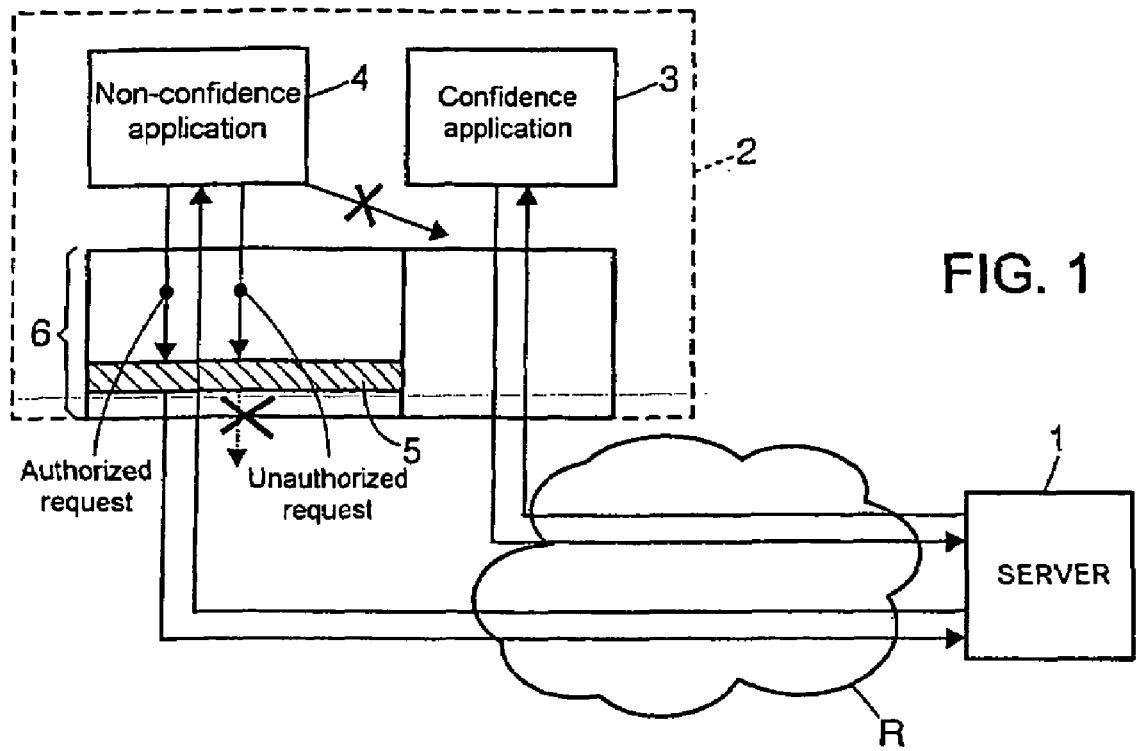
FIGS. 1 and 2 are diagrams of a system implementing the invention.

The present context is that of a terminal 2 making a distinction between confidence applications 3 and non-confidence applications 4. This distinction entails separate capacities for the transmission of frames or requests on the network R. The non-confidence applications 3 are limited in terms of the frames that they can transmit which, in the diagram shown in FIG. 1, is represented by a control layer 5 which forms part of the network access resources 6 with which the terminal 2 is equipped.

The control layer 5 checks that certain characteristics are met by the frames transmitted by the non-confidence applications 4. If these characteristics are met, the control layer allows the frames to pass. If not, it can either not allow them to pass to the network R and report this to the non-confidence application 4 which transmitted them, or modify the frames so that they comply with the constraints of the non-confidence applications. In this last case, the frame then loses its credibility in the eyes of the server 1, which will not handle it.

The invention uses this control layer 5 (the presence of which may only be implicit and may result from characteristics of the operating system or, more generally, the applications-running environment in the semi-open terminal) to prevent a non-confidence application 4 from itself transmitting requests which would provide a server with proof of the consent of the user relating to the question asked. Such an application cannot therefore itself capture the user's consent in a form which can be handled by the server 1.

A confidence software component 8, the behavior of which has previously been assured as "honest", is therefore introduced in the terminal 2 between the non-confidence application, the server and the user. In practice, this assurance often originates from the manufacturer of the semi-open terminal. The confidence component 8 cannot be replaced or modified by a non-confidence application, this being assured by the semi-open system itself, for which a confidence application must remain a confidence application. There is therefore no risk that the component 8 will behave like a Trojan horse. A main role of the confidence component 8 is to capture the user's consent on behalf of one or more non-confidence applications 4 by means of a user interface 9 of the terminal.

The confidence component 8 is not limited in the requests that it can transmit, or it is at least subject to less severe restrictions than the non-confidence applications 4. In the example shown schematically in FIG. 2 above, it is not controlled by the control layer 5.

Interest is focused on an application 3 or 4 that wishes to prove to a remote server 1 that it has obtained the user's consent for a given question. It initially has the question statement and addressing data which enable it to contact the remote server, for example an indication of the URL ("Uniform Resource Locator") type.

The communications of these applications 3, 4 are subjected to the following rules:

the applications can carry out remote communications via the resources 6 and the network R, but these communications are limited by the semi-open operating system which incorporates a logical control layer 5;

any remote server 1, knowing these applied limits, can determine whether the messages that it receives originate from confidence applications or not by examining whether the limits are applied;

the confidence component 8 has the facility to carry out communications outside the limits imposed on the non-confidence applications 4, but also within these limits if it wishes. In this respect, it can be regarded as belonging to the same family as the confidence applications 3.

A non-confidence application that wishes to obtain the user's consent to a given question and to prove this consent to a remote server 1 provides the confidence component 8 with the question statement and the address of the server. The confidence component 8 then presents the question to the user by means of the interface 9. The user's decision (to accept or refuse, the absence of a response after a certain period of time being able to be interpreted as a refusal) is captured by the confidence component.

If the decision captured is a consent, a request outside the limits applied to the non-confidence applications is sent by the confidence component to the server at the address previously indicated by the application 4. This request contains:

the question statement, the user's response.

The server 1 implicitly or explicitly checks that the request has actually been transmitted outside the limits applied to the non-confidence applications, and responds to this request following validation. The response to the request is finally transmitted by the confidence component 8 to the non-confidence application 4.

In the case of refusal on the part of the user observed by the confidence component 8, the latter can transmit a response indicating the refusal directly to the application 4. The negative response of the user is only optionally transmitted to the server 1 in this case.

If it has confidence in the "confidence component" 8, the remote server 1 is assured that the requests outside the limits that it receives in fact correspond to questions which have been posed to the user, and that the user's choice has been correctly captured. A non-confidence application cannot simulate this behavior. The Trojan horse risk has therefore been eliminated.

If the check by the server 1 of the request deemed to indicate the user's consent shows that it has been transmitted within the limits applied to non-confidence applications, this request is not interpreted as being representative of the user's consent. This refusal of the server can optionally be reported back to the terminal.

Naturally, the question posed to the user may invoke a response of any type, more elaborate than "yes/no". The question may, in particular, be presented as a form in which a plurality of entries are to be supplied by the user. In this case, the different entries provided by the user can be transmitted to the server after the confidence component 8 has requested and obtained a validation from the user.

In the preceding description, the non-confidence application 4 itself generates the question text. If it is preferred that the server 1 generates the question text, it is possible, for example, to proceed as follows:

an non-confidence application 4 submits to the confidence component 8 the address of a server 1 (for example a URL) and an appropriate request to send to it to obtain the statement of the question to be posed;

the confidence component 8 transmits the request via the network R in order to request the question statement from this server 1. The request is preferably sent via the control layer 5 in order to guarantee that it is within the limits authorized for non-confidence applications 4;

the server 1 forwards the question statement, in association with a reference to be re-used later during the transmission of the user's consent;

the confidence component 8 presents the question to the user as previously;

the user makes his decision;

the user's decision is captured by the confidence component 8;

in the case of consent, the confidence component 8 transmits a request to the server 1, this time outside the limits imposed on non-confidence applications, and including the statement reference and stipulating that the user has indeed given his consent (the reference can be optional, in which case the confidence component repeats the question statement in the request transmitted at this stage; generally, it will suffice that the question posed is adequately identified in the message transmitted to the server to indicate the user's consent);

the server 1 validates the request by checking that it has actually been received outside the limits imposed on non-confidence applications, and responds to this request;

the response is transferred to the application which initiated the request.

As it has been assured that the request originating directly from the non-confidence application 4 has been passed via the control layer 5, the server 1 rests assured that the requests outside the limits which it receives from the confidence component 8 actually result from an explicit consent of the user.

Figure 2:
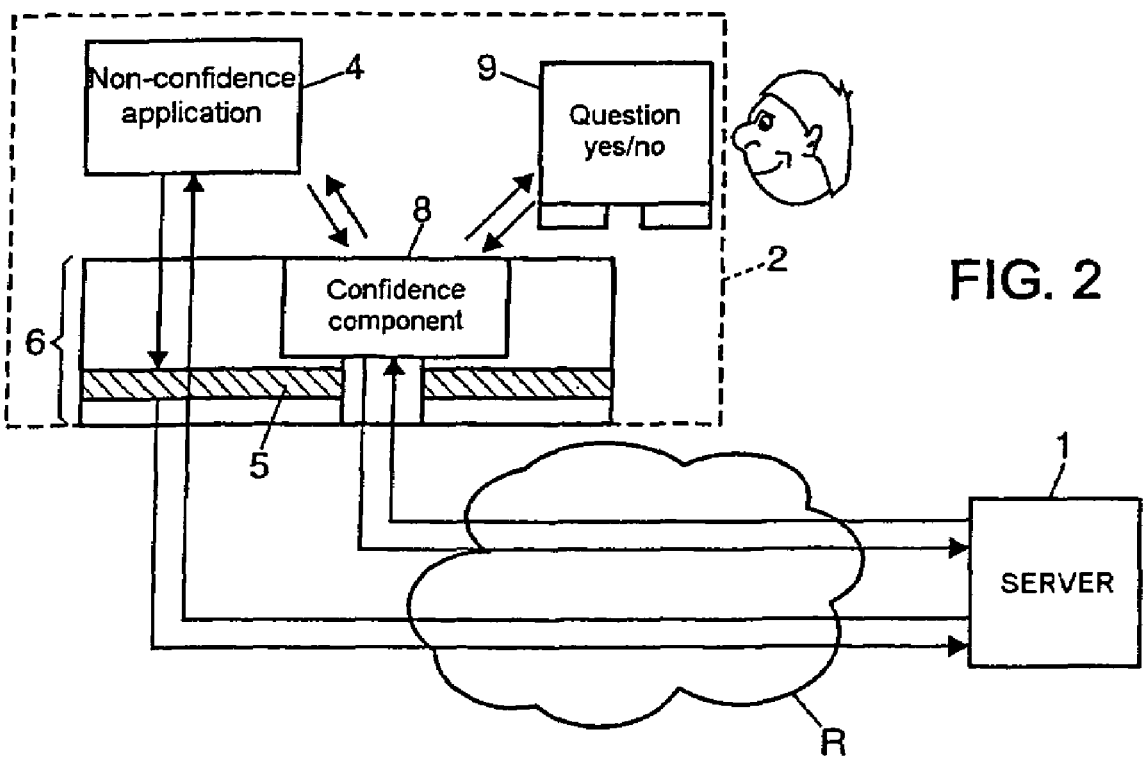

In a specific embodiment of the invention, the terminal has a virtual Java machine which may correspond to the module 6 shown in FIGS. 1 and 2. The virtual machine enables the execution of downloaded applications written in the Java programming language developed by Sun Microsystems, Inc. All the Java language instructions are executed by the virtual machine, using system functions following a certain control. Java applications involve a semi-open environment, since there is no uncontrolled invocation of system functions.

The non-confidence application 4 is then written in Java language.

In this embodiment, the protocols used for the exchanges of the terminal 2 on the network R are HTTP (RFC 1945 ("Request For Comments"), published in May 1996 by the IETF ("Internet Engineering Task Force")), TCP (RFC 793, IETF, September 1981) and IP (RFC 791, IETF, September 1981). The limit applied to non-confidence applications is that they cannot address requests to URLs of the following type: "http://<server>/<path>/consent?<continuation>", where <server> is any given server name, <path> is a series of character strings in the form "directory_1/directory_2/ . . . /directory_n" and <continuation> is any string of characters. This limit is of course an example, and any other limits can be imposed. The service is hosted by an HTTP server.

The confidence component 8 can then be implemented in the virtual Java machine by the UserConfirmation class. It is accessible from Java applications 4 by a class function: InputStream UserConfirmation.ask(String url, String question), the function of which is as follows. When a non-confidence application 4 invokes the function UserConfirmation.ask (String url, String question):

the confidence component 8 opens a window or actually takes control of the terminal on the application currently running;

the question whose statement is given by the string of characters "question" is displayed on-screen, and two choices are offered to the user, i.e. "OK" and "Cancel";

if the user gives his consent, by selecting "OK":

the confidence component 8 sends on the network R the HTTP request formed by the concatenation (i) of the URL passed as a parameter ("url"), (ii) of the string "/consent?question=", (iii) of the statement of the question posed to the user (encoded in an encoding format in the URL x-www-urlencoded), and of the string "&responseOK". This behavior is of course only an example which corresponds to the limitation imposed on the requests originating from Java applications. A server is assured by this combination that the requests sent at this stage by the confidence component could not have been sent by the Java applications, thereby meeting the requirement;

if the confidence component 8 then receives the response from the server 1 (or an exception if the server is not available), it returns an InputStream object to the invoking application 4 which enables this application to know the response of the server;

if the user does not give his consent, by selecting "Cancel":

the confidence component 8 forwards an exception to the invoking application 4.

This particular embodiment can be illustrated by the case in which the server manages a micropayment service which makes payments online on behalf of the user simply with the consent of said user. The payments are debited to an account corresponding to the user. If it receives a payment order, this service therefore wants to make sure that this order is actually confirmed by the user, and does not originate from a malicious Java program which has not presented any question to the user, or indeed which has presented the user with a misleading question. This service is of course an example, and any other service requesting the user's consent can be implemented thanks to this technique (document publication, file management, messaging, etc.).

In this example, the payment service controls the "payment.com" website. If a non-confidence application wishes to offer a payment to the user, it invokes the UserConfirmation.ask function, providing it with the following parameters:

as the URL: http://payment.com/payment, as the question statement: "Pay €1 to Acme Co.?"

The confidence component 8 takes control of the terminal 2, and asks the user "Pay €1 to Acme Co.? OK/Cancel". If the user selects the "OK" link, the confidence component transmits the request "http://payment.com/payment/consent?question=pay+€1+to+Acme+Co.?&response=OK" and transmits the response from the server to the invoking application 4 with a return handshake.

If the user selects the "Cancel" link, the confidence component 8 does not transmit any request and returns an exception to the invoking application 4.

If an application 4 attempts to request directly the page "http://payment.com/payment/consent?question=pay+€1+to+Acme+Co.?&response=OK", this request is refused by the limitation imposed on non-confidence applications.

The method as claimed in the invention can be further illustrated by the case in which the server manages an electronic commerce service. In the context of a service of this type, the customer is prompted to complete an order form. This form is to be sent according to the HTTP POST method to the address "http://service.com/order".

The confidence component can then be implemented in the virtual Java machine. It is accessible from Java applications via the following function: "UserConfirmation.askForm (String url, byte[ ] form)".

If this function is invoked by a Java application 4, the confidence component 8:
  displays on-screen the form contained in the "form" table supplied as a parameter of the function. This form is, for example, in XML format;
  allows the user to complete the form fields and asks the user to validate this by selecting "OK" or "Cancel" at the end of the form;
  sends an HTTP POST request, if the user validates the form, to the URL "url+/consent?", this request containing the form which was presented to the user, along with the data entered by the user in the different fields.

If a non-confidence Java application 4 attempts to access directly the address "url+/consent?", the request will be refused by the control layer.

Moreover, an application could attempt to mislead the user by making him complete a form containing the same entries as the authentic form, but with different headings. This attack is equally thwarted by the fact that the form is transmitted to the server 1 by the confidence component 8. In this way, the server 1 can actually check that the form completed by the user is indeed a legitimate form.

To clarify the description, a simple example has been taken of the limitation imposed on non-confidence applications, i.e. certain URLs are not accessible, this being controlled at the time of transmission of a request. Nevertheless, any other limitation would be acceptable.

In particular, complete blockage of any access to the network R for non-confidence applications 4 could be used, a selective blockage authorizing only requests to the originating website of a downloaded application, etc.

The limitation may also relate to a specific marking associated with either non-confidence applications 4 or confidence applications 3. Each request originating from a non-confidence application 4 which is transmitted on the network R and is destined for the server 1 is then forced by the control layer 5:
  /1/ either to include a marking associated with the family of non-confidence applications,
  /2/ or not to include a marking associated with the family of confidence applications, this marking then being included in at least some of the requests transmitted on the network R and originating from confidence applications.

In case /1/, the confidence component 8 does not place the marking in the requests transmitted to indicate the user's consent, thereby assuring the server 1 that this consent actually originates from the user. The confidence component 8 may, on the other hand, mark the request transmitted on the network R to obtain the statement of the question to be posed in the event that this statement is not supplied directly by the application 4.

Conversely, in case /2/, the confidence component 8 places the marking in the requests transmitted to indicate the user's consent, and, if appropriate, it does not mark the requests transmitted on the network R to obtain the statement of the question to be posed.

In the example in which the confidence component 8 forms part of a virtual Java machine 6, the marking of case /1/ consists, for example, in that the "User-Agent" header field of the HTTP requests (cf. section 10.15 of the aforementioned RFC 1945) contains a specific string such as "Non-confidence application: VM Java 1.2" which indicates by its presence that the request does not originate from a confidence application. An opposite statement can be provided in case /2/.

What is claimed:

1. A method for communication between a first unit and a second unit via a telecommunications network, wherein the first unit comprises a first family of applications and a second family of applications, and the first unit imposes a limitation on the communications of the applications of the first family, said limitation being detectable by the second unit for determining whether a communication from the first unit is originated by an application of the first family or an application of the second family, the method comprising the steps of:
  /a1/ executing in the first unit an application of the first family which was not downloaded from the second unit, the execution comprising posing a question to a user of the first unit;
  /a2/ obtaining, by a confidence component belonging to the second family of applications, a statement of said question, said obtaining comprising the following sub-steps:
    /a2-1/ indicating from said application of the first family to the confidence component an address of the second unit and a request to be submitted in order to obtain the statement of the question from the second unit;
    /a2-2/ transmitting the request from the confidence component to the indicated address via the network;
    /a2-3/ retrieving the statement of the question at the confidence component from a response to the request returned by the second unit via the network;
  /b/ presenting the question by the confidence component via a user interface and capturing a response from the user by the confidence component; and
  /c/ for at least one type of response from the user, transmitting from the confidence component to the second unit, via the network, at least one message identifying the question presented and indicating the response captured, said message being transmitted without the limitation imposed to the applications of the first family, such that for the type of response reflecting a refusal of the user in relation to the question posed, the confidence component does not transmit the message of step /c/ to the second unit, the transmission of the message transmitted in step /c/ enabling a validation of the response of the user at the second unit by making sure that said message has actually been transmitted without the limitation imposed to the applications of the first family.

2. The method as claimed in claim 1, wherein the question posed is identified in the message of step /c/ by including the question statement in said message.

3. The method as claimed in claim 1, wherein, for at least one other type of response reflecting a refusal of the user in relation to the question posed, the confidence component indicates the refusal to said application of the first family.

4. The method as claimed in claim 1, further comprising the step of validating the response of the user at the second unit on receipt of the message transmitted in step /c/ by making sure that said message has actually been transmitted under conditions inaccessible to the applications of the first family.

5. The method as claimed in claim 4, further comprising the step of returning, following validation of the user's response, a response message from the second unit to the confidence component via the network.

6. The method as claimed in claim 5, wherein the confidence component indicates to said application of the first family the content of the response message received from the second unit.

7. The method as claimed in claim 1, wherein the statement of the question is indicated directly to the confidence component in step /a2/ by said application of the first family.

8. The method as claimed in claim 7, wherein said application of the first family indicates an address of the second unit with the statement of the question in step /a2/.

9. The method as claimed in claim 1, wherein the request is transmitted by the confidence component in sub-step/a2-2/ under conditions accessible to the applications of the first family.

10. The method as claimed in claim 1, wherein the response to the request returned by the second unit further includes a reference, said reference being stored by the confidence component and then inserted into the message transmitted in step /c/ to identify the question posed.

11. The method as claimed in claim 1, wherein said application of the first family is a program written in Java language, and the confidence component is incorporated in a virtual Java machine with which the first unit is provided.

12. The method as claimed in claim 1, wherein the applications of the second family have the capacity to access, via the network, at least one URL associated with the second unit and inaccessible to the applications of the first family.

13. The method as claimed in claim 1, wherein the applications of the first family are not capable of accessing the network.

14. The method as claimed in claim 1, wherein the applications of the first family have the capacity, in a determined transfer protocol, to access only a single remote site which does not comprise the second unit.

15. The method as claimed in claim 1, wherein each request originating from an application of the second family transmitted on the network and destined for the second unit is forced to include a marking associated with the second family of applications.

16. The method as claimed in claim 1, wherein each request originating from an application of the second family transmitted on the network and destined for the second unit is forced not to include a marking associated with the first family, said marking being included in at least some of the requests transmitted on the network and originating from applications of the first family.

17. The method as claimed in claim 15, wherein the requests comprise HTTP requests, and the marking is inserted in the headers of the HTTP requests.

18. A communications terminal comprising means for communicating with a remote first unit via a telecommunications network and hosting a first family of applications and a second family of applications, and the remote unit imposes a limitation on the communications on the network of the applications of the first family, said limitation being detectable by a second unit for determining whether a communication from the remote unit is originated by an application of the first family or an application of the second family, wherein the second family of applications comprises a confidence component including instructions to control the following steps in an execution of the component:

/a1/ executing in the first unit an application of the first family which was not downloaded from the second unit, the execution comprising posing a question to a user of the first unit;

/a2/ obtaining by the confidence component belonging to the second family of applications, a statement of the question to be posed to a user of the communications terminal in the context of an execution of an application of the first family, said obtaining comprising the following sub-steps:

/a2-1/ indicating from said application of the first family to the confidence component an address of the second unit and a request to be submitted in order to obtain the statement of the question from the second unit;

/a2-2/ transmitting the request from the confidence component to the indicated address via the network;

/a2-3/ retrieving the statement of the question at the confidence component from a response to the request returned by the second unit via the network;

/b/ presenting the question via a user interface and capturing a response from the user; and /c/ for at least one type of response from the user, transmitting from the confidence component to the remote first unit, via the network, at least one message identifying the question presented and indicating the response captured, said message being transmitted without the limitation imposed to the applications of the first family, such that for the type of response reflecting a refusal of the user in relation to the question posed, the confidence component does not transmit the message of step /c/ to the second unit, the transmission of the message transmitted in step /c/ enabling a validation of the response of the user at the second unit by making sure that said message has actually been transmitted without the limitation imposed to the applications of the first family.

* * * * *